United States Patent
Peterson et al.

(10) Patent No.: US 9,331,376 B2
(45) Date of Patent: *May 3, 2016

(54) BASAL-PIVOTING UNDERWATER RFID ANTENNA ASSEMBLY

(71) Applicant: West Fork Environmental, Inc., Olympia, WA (US)

(72) Inventors: N. Phil Peterson, Olympia, WA (US); Kyle B. Meier, Olympia, WA (US)

(73) Assignee: West Fork Environmental, Inc., Olympia, WA (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/925,614

(22) Filed: Jun. 24, 2013

(65) Prior Publication Data

US 2014/0159967 A1    Jun. 12, 2014

Related U.S. Application Data

(60) Provisional application No. 61/735,819, filed on Dec. 11, 2012, provisional application No. 61/811,760, filed on Apr. 14, 2013.

(51) Int. Cl.
*H01Q 1/34* (2006.01)
*H01Q 1/04* (2006.01)
(Continued)

(52) U.S. Cl.
CPC .............. *H01Q 1/04* (2013.01); *A01K 11/006* (2013.01); *A01K 61/001* (2013.01); *G06K 7/10316* (2013.01); *G06K 7/10356* (2013.01); *H01Q 1/2216* (2013.01); *H01Q 1/42* (2013.01)

(58) Field of Classification Search
CPC ....... H01Q 1/04; H01Q 1/084; H01Q 1/2208; H01Q 1/244
USPC .......................................... 343/709, 719, 878
See application file for complete search history.

(56) References Cited

U.S. PATENT DOCUMENTS 4,439,772 A * 3/1984 Van Kol .................. H01Q 9/32
                                                               343/749
4,533,945 A    8/1985 Lauvray et al.
(Continued)

FOREIGN PATENT DOCUMENTS

EP    1992967 A2    11/2008

OTHER PUBLICATIONS

Ibbotson, A.T., et al. "A cross-river antenna array for the detection of miniature passive intergrated transponder tags in deep, fast flowing rivers", Journal of Fish Biology (2004) 65, 1441-1443.*

(Continued)

*Primary Examiner* — Dameon E Levi
*Assistant Examiner* — Collin Dawkins
(74) *Attorney, Agent, or Firm* — Zeman-Mullen & Ford, LLP

(57) ABSTRACT

An underwater basal-pivoting antenna assembly (or array thereof) suitable for subsurface RFID tag interrogation in flowing water such as a river. In preferred embodiments, the antenna interrogates RFID tags implanted in aquatic species. The antenna resides in an elongate antenna housing whose cross-sectional shape is preferably a hydrodynamic teardrop shape. When the assembly is deployed in water with a lower end thereof anchored below an upper end, the lower end of the housing is linked to a pivot/swivel mechanism such that when the pivot/swivel mechanism is held substantially stationary with respect to the water flow, the upper end of the housing is free to rotate generally about the first end, including in a substantially vertical plane parallel to the water flow direction. The length of the antenna housing is advantageously selected to enable the antenna to monitor for signals across substantially the entire water depth.

18 Claims, 3 Drawing Sheets

(51) Int. Cl.
*H01Q 1/22* (2006.01)
*H01Q 1/42* (2006.01)
*A01K 11/00* (2006.01)
*G06K 7/10* (2006.01)
*A01K 61/00* (2006.01)

(56) References Cited

U.S. PATENT DOCUMENTS

| 4,675,686 | A | 6/1987 | Robinson et al. | |
|---|---|---|---|---|
| 4,726,315 | A | 2/1988 | Bell et al. | |
| 2007/0075708 | A1* | 4/2007 | Reddig | G01V 3/083 324/337 |
| 2008/0000049 | A1* | 1/2008 | Moskowitz | H01R 35/025 16/330 |
| 2009/0002261 | A1* | 1/2009 | Bohm | F16M 11/10 343/882 |
| 2009/0231953 | A1 | 9/2009 | Welker et al. | |

OTHER PUBLICATIONS

Commonly assigned and commonly invented U.S. Appl. No. 13/925,614 filed Jun. 24, 2013.

Commonly assigned and commonly invented U.S. Appl. No. 13/925,634 filed Jun. 24, 2013.

Minutes document dated Feb. 7, 2013 from Meeting at US Army Corps of Engineers, Portland District, OR on Feb. 7, 2013. Highlights in original. See section 14 and related material. Available at http://www.nwd-wc.usace.army.mil/tmt/documents/FPOM/2010/FFDRWG/2013%20February%20FFDRWG/ but as of Jun. 27, 2013 it is no longer available on the website.

Powerpoint document referred to in section 14 of minutes document from Meeting at US Army Corps of Engineers, Portland District, or on Feb. 7, 2013. Document was previously available at http://www.nwd-wc.usace.army.mil/tmt/documents/FPOM/20101FFDRWG/2013%20February%20FFDRWG/ but as of Jun. 27, 2013 it is no longer available on the website.

Drawing in published materials from Meeting at US Army Corps of Engineers, Portland District, or on Feb. 7, 2013. Document was previously available at http://www.nwd-wc.usace.army.mil/tmt/documents/FPOM/2010/ FFDRWG/ 2013%20February%20FFDRWG/ but as of Jun. 27, 2013 it is no longer available on the website.

"Project Work Plan and Impacts Document" dated Feb. 22, 2013 from Meeting at US Army Corps of Engineers, Portland District, or on Feb. 7, 2013. Document was previously available at http://www.nwd-wc.usace.army.mil/tmt/documents/FPOM/2010/FFDRWG/2013%20February%20FFDRWG/ but as of Jun. 27, 2013 it is no longer available on the website.

International Search Report and the Written Opinion of the International Searching Authority in PCT/US2013/074189 mailed Mar. 20, 2014 (9 Pages).

Ibbotson, A.T., et al, "A cross-river antenna array for the detection of miniature passive integrated transponder tags in deep, fast flowing rivers", Journal of Fish Biology (2004) 65, 1441-1443.

* cited by examiner

BASAL-PIVOTING UNDERWATER RFID ANTENNA ASSEMBLY

RELATED APPLICATIONS

This application claims the benefit of, and priority to, both of the following two commonly-invented U.S. Provisional applications: (1) Ser. No. 61/735,819, filed Dec. 11, 2012; and (2) Ser. No. 61/811,760, filed Apr. 14, 2013.

GOVERNMENT LICENSE RIGHTS

This invention was made with Government support under Contract No. R12PX80431 awarded by the United States Bureau of Reclamation. The U.S. Government has certain rights in the invention.

FIELD OF THE INVENTION

The disclosure of this application is related generally to RFID antennal systems, and more specifically to submersible applications of such systems (such as in flowing streams or rivers) that are useful to monitor, for example, the migration and biometrics of underwater species.

BACKGROUND

The use of Radio Frequency Identification ("RFID") tags to monitor migration or biometrics of species is well known in the art. It is also well known to implant such RFID tags subcutaneously, within the musculature or within the body cavity of fish and other underwater species. Transponders suitable for implantation in fish and other underwater species necessarily have to be small, and are typically glass-encapsulated in order to be biologically inert.

Numerous types and styles of air or ferrite core antennas have been developed and used for underwater interrogation of RFID tags on fish and other underwater species. Typically such antennas include an air core antenna that is positioned flat on a substrate and deployed in a housing. The housing may be plastic pipe, or welded sheets of plastic, or similar materials and construction. Multiple wire coils may also be deployed within such a housing, typically held in position relative to each other, and as a unit, within a gallery or similar structure.

The charging and reading zone for small glass-encapsulated transponders is typically limited to distances less than 2.5 feet in the zone immediately above the antenna. Precise performance depends on factors such as the type and quality of the transceiver and antenna system, the level of ambient electromagnetic interference and the operable quality of the RFID tag itself. Some conventional air coil antennas are known to be mounted upright within the water column, perpendicular to the flow of water. Such placement has shown a tendency to increase the charging zone or read zone of transponders. Properly configured and deployed at appropriate settings, the charging zone and read zone of such antenna systems can extend to the entire water column. However, the placement of such antennas, coupled with their vertical orientation, makes these more likely to be damaged by floating debris and high water velocities in streams and rivers, especially during seasonal high water events.

Therefore, there exists a need for an improved antenna system that can read RFID tags throughout the entire water column, and yet withstand the potential physical abuse in stream or river deployments caused by high water velocity or turbulence, or by impact with moving debris or ice.

SUMMARY AND TECHNICAL ADVANTAGES

The inventive disclosure of this application addresses one or more of the above-described drawbacks of the prior art. Such inventive disclosure includes an array of RFID antennas configured, at a rest position, in a substantially vertical or angled (parallel to flow, deflecting downstream) underwater orientation. For moving water deployments (such as rivers or streams), the antennas provide a hydrodynamic teardrop-shaped profile in cross-section, in which the teardrop shape has an elongated tail. The antennas are oriented such that the tail is deployed on the downstream side of the flow of water past the array. The symmetric nature of the hydrodynamic teardrop shape keeps lateral hydrodynamic/hydraulic forces on the antenna neutral, while also minimizing the effects of hydrodynamic drag and flow-induced vibration exerted on the antennas by the flow of water past the antennas in the array.

Each antenna in the array is further held in place via a pivoting structure that acts like a hinge at one of either ends. The pivots are oriented generally so that, in moving water deployments, individual antennas may pivot independently downstream responsive to temporary (or even momentary) bursts of additional force caused by, for example, seasonal high water flow, turbulence or passing or accumulating debris.

As noted, an array of antennas may deploy its antenna pivoting structure at either end of the antennas. That is, top-end pivoting embodiments of antenna arrays may provide the pivoting structure at the water surface end of each of the vertically-disposed antennas, while basal-pivoting embodiments of arrays may provide the pivoting structure at the riverbed (or other ground bottom) end. Top-end pivoting embodiments, in which each antenna pivots independently from a hinged connection at the water surface end, provide pivoting and suspension of the antennas via a cable or solid member strung above the antennas and transverse to the direction of water flow. Basal-end pivoting embodiments, in which each antenna pivots independently from a hinged connection at the river bed end, provide a pivot assembly connected to the basal end of each antenna via in currently preferred embodiments, a substantially horizontally-disposed pin or axle. The pin on each pivot assembly is oriented transverse to the direction of water flow so as to allow antennas to rotate in a substantially vertical plane of water flow about the pin. Each pivot assembly is in turn anchored to the river bed (or other user-selected plane of anchoring). Future embodiments of the pivot assembly may include inventive technology in which the pivot assembly is either partially or fully articulated, so that antennas may also deflect laterally, in planes other than the vertical plane of water flow.

In top-end pivoting arrays of antennas, counterweighting deployed at or near the other (basal) ends of each antenna cause the antennas to tend to return to a substantially vertical or angled (parallel to flow, deflected downstream) rest position in the water column. Conversely, basal-end pivoting arrays of antennas rely on the natural buoyancy of each antenna to cause the antenna to tend to return to a substantially vertical or angled (parallel to flow, deflected downstream) rest position in the water column. The air core antenna housing naturally creates this buoyancy and additional assistance to return to the rest position may be provided by torsion springs built into the pivot assembly, as further described below.

Antennas in each array are multiplexed or synchronized electronically to transceivers that may be mounted in any suitable location, such as within the antenna housing, the housing cap, the antenna base, on shore, or nearby underwater. Each antenna may be driven by a single transceiver, or alternatively multiple antennas may be powered by a single transceiver or a single channel on a multi-channel transceiver.

It is therefore a technical advantage of the vertically-oriented antenna arrays disclosed herein to be less susceptible, in moving water deployments, to damage from high velocity or high turbulence water flows, or from passing or accumulating debris. According to the disclosure herein, antennas may deflect and thus shed debris rather than receiving the full impact of passing debris, or providing a point for accumulation of debris.

A further technical advantage of the vertically-oriented antenna arrays disclosed herein is that by tending to return to a vertical or angled (parallel to flow) rest position, they are able to detect and interrogate passing RFID tags (attached to underwater species) more consistently over the entire water column.

A further technical advantage of the vertically-oriented antenna arrays disclosed herein is that they can be used to set up variable sampling schemes to collect data for more precise statistical analysis. Multiplexing and/or synchronization of the individual antennas enable such sampling schemes, in that the antenna array divides the water course cross-section into discrete vertical read zones within which all tagged species have a high likelihood of being detected. The electronic controller may then be used to differentially focus the sampling effort on vertical read zones in which tagged species are more likely to travel, thus enhancing the quality and amount of data collected. Subsequent statistical analysis may then include analysis of RFID tag detection rates and hence estimates of the numbers of fish, for example, passing the site.

The foregoing has outlined rather broadly the features and technical advantages of the inventive disclosure of this application, in order that the detailed description of the embodiments that follows may be better understood. It will be appreciated by those skilled in the art that the specific embodiments disclosed may be readily utilized as a basis for modifying or designing other structures for carrying out the same general purposes of the inventive material set forth in this disclosure.

BRIEF DESCRIPTION OF THE DRAWINGS

For a more complete understanding of embodiments described in detail below, and the advantages thereof, reference is now made to the following drawings, in which.

DETAILED DESCRIPTION

Figure 1:
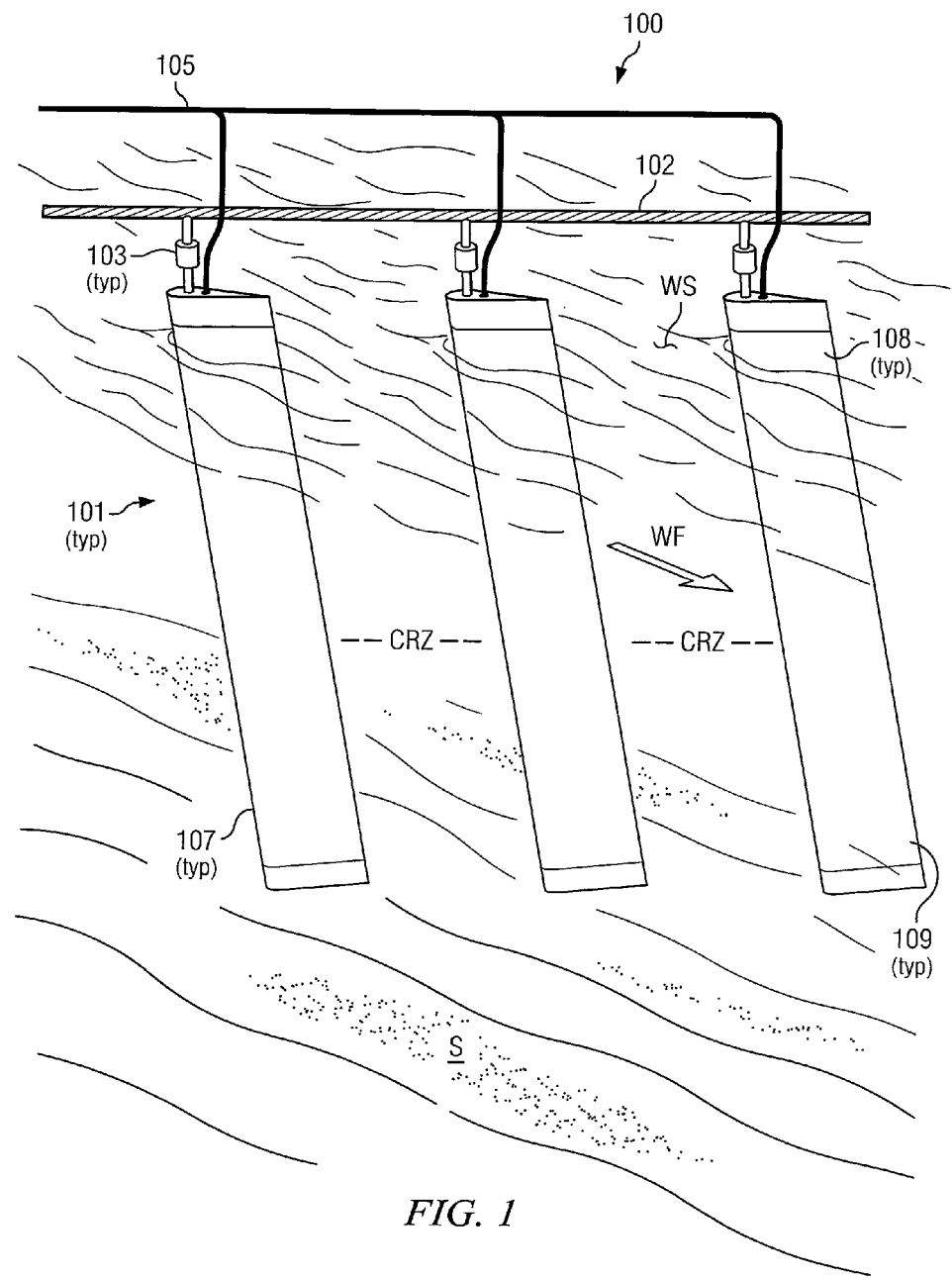
FIG. 1 illustrates one top-end pivoting embodiment of the inventive antenna arrays disclosed in this application.

FIG. 1 illustrates one example of a top-end pivoting embodiment of the vertically-oriented antenna arrays disclosed herein. It will be seen on FIG. 1 that the array 100 is deployed in moving water (such as a stream or river) with a nominal direction of water flow as indicated by arrow WF. Each antenna comprises an elongate antenna housing 101 having a hydrodynamic teardrop shape in cross-section. The advantageous hydrodynamics of the hydrodynamic teardrop shape are discussed above in the first paragraph of the "Summary" section of this disclosure. This inventive disclosure is not limited, however, to antenna housings with a teardrop shape in cross-section. In other embodiments (not illustrated), the antenna housing's cross-sectional shape may also be round, ovate, oblong, square or another shape befitting the installation conditions and antenna windings.

The external shell of antenna housing 101 is made of non-ferrous materials such as, without limitation, non-ferrous metals or alloys, wood, plastics, rubber, fiberglass, carbon fiber or resins. Antenna housing 101 may also be coated on the outside with materials or resins selected to increase durability or protect against abrasion. For wood shells, waterproofing is advantageous using resins or the like.

Each antenna on FIG. 1 provides first end 108 and second end 109, and is suspended from a support cable 102 at first end 108. The support cable 102 may be suspended from any suitable anchoring points, such as, for example, anchors on the shore or on banks of a river, or permanent concrete structures in the water itself. In preferred embodiments, the support cable 102 on FIG. 1 will be understood to be disposed substantially perpendicular to the direction of water flow WF, so that each antenna remains substantially in the vertical plane of water flow WF, although the inventive material disclosed herein is not limited in this regard. The support cable 102 may be deployed at other angles with respect to the direction of water flow WF, per user selection, and a swivel mechanism in the pivot assemblies 103 (as described further below) enables each antenna nonetheless to remain substantially in the vertical plane of water flow WF. The support cable 102 may be made from any conventional metallic or non-metallic construction.

In FIG. 1, the support cable 102 is illustrated as located above the water surface WS. However, the inventive material disclosed herein is not limited in this regard. Other embodiments (not illustrated) may deploy the support cable 102 below the surface of the water at user-selected depths. Such other embodiments (not illustrated) may also set the support cable 102 at other user-selected orientations and anchor points.

FIG. 1 also illustrates the support cable 102 being available to support one or more power and/or communications cables 105 addressing each of the antennas. Such power or communications cables 105 connect the antennas to a power supply, a transceiver and other hardware that may be located elsewhere, such as on the shore, within the antenna housing 101, or nearby underwater. Each antenna may receive a separate power and/or communications cable 105, or alternatively a single power and/or communications cable 105 may be attached to one end of the array 100 and pass through to neighboring antennas.

FIG. 1 further illustrates each antenna suspended from the support cable 102 by its own pivot and swivel assembly 103. In current embodiments, the design and construction of the pivot and swivel assemblies 103 is conventional, although in future embodiments it may be inventive. As noted above, the swivel structure in the pivot and swivel assemblies 103 allows each antenna to remain oriented substantially in the vertical plane of water flow WF. The pivot structure in the pivot and swivel assemblies 103 leaves the antenna free to rotate about the support cable 102. Each hanging antenna may thus deflect responsive to temporary (or momentary) bursts of force or impact placed upon it by events such as seasonally high water flows, turbulence, or passing or accumulating debris. Such deflection will be understood to be primarily by rotating about the support cable 102 in the vertical plane of water flow WF. However, in preferred embodiments, each pivot and swivel assembly 103 is also sufficiently articulated to permit its corresponding antenna to deflect in other planes as well.

Counterweights 107 are also illustrated on FIG. 1 at the basal (riverbed S) end of each antenna. These counterweights 107 operate to cause the antennas to tend to return to a vertical or angled (parallel to flow, deflected downstream) rest position after momentary deflection by, for instance, passing or accumulating debris. Alternatively a portion of the antenna housing 101 may be flooded with water to create a neutrally buoyant antenna, requiring little (if any) further counterweighting.

It will be appreciated from FIG. 1 that an array of antennas may be dimensionally configured by user selection of the lengths of the antennas and the spacing along the support cable at which each one is fixed. RFID charge and read zones CRZ are thus created between the antennas that extend nominally the entire length of antennas (as shown on FIG. 1). When the length of antennas is selected to be long enough, the entire depth of the water column potentially becomes available for RFID tag detection and interrogation. RFID charge and read zones CRZ will be only temporarily compromised while antennas deflect, and will be restored when the antennas return to their substantially vertical or angled (parallel to flow, deflected downstream) rest position.

Figure 2:
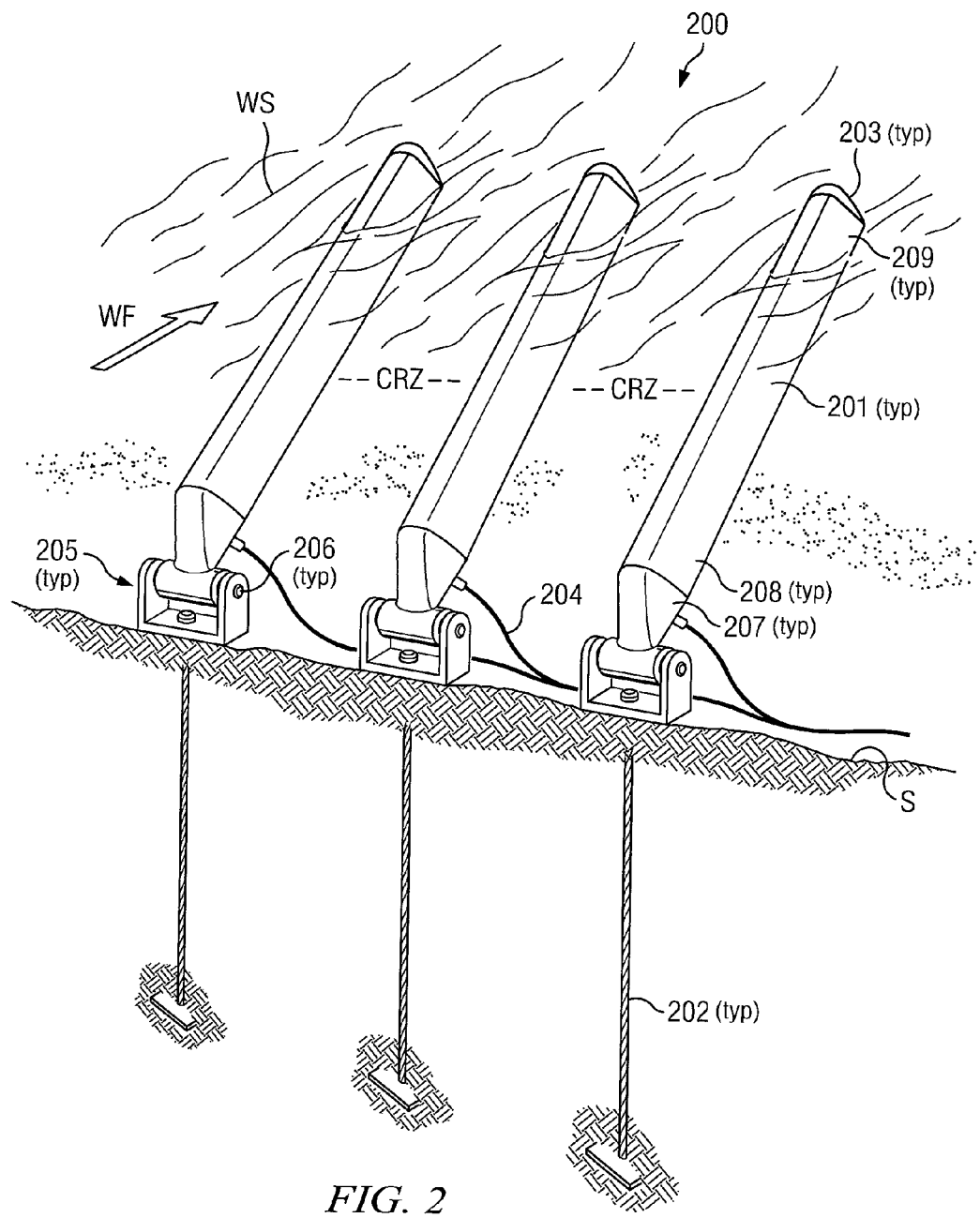
FIG. 2 illustrates a basal-end pivoting embodiment of the inventive antenna arrays disclosed in this application.
Figures 3, 4:
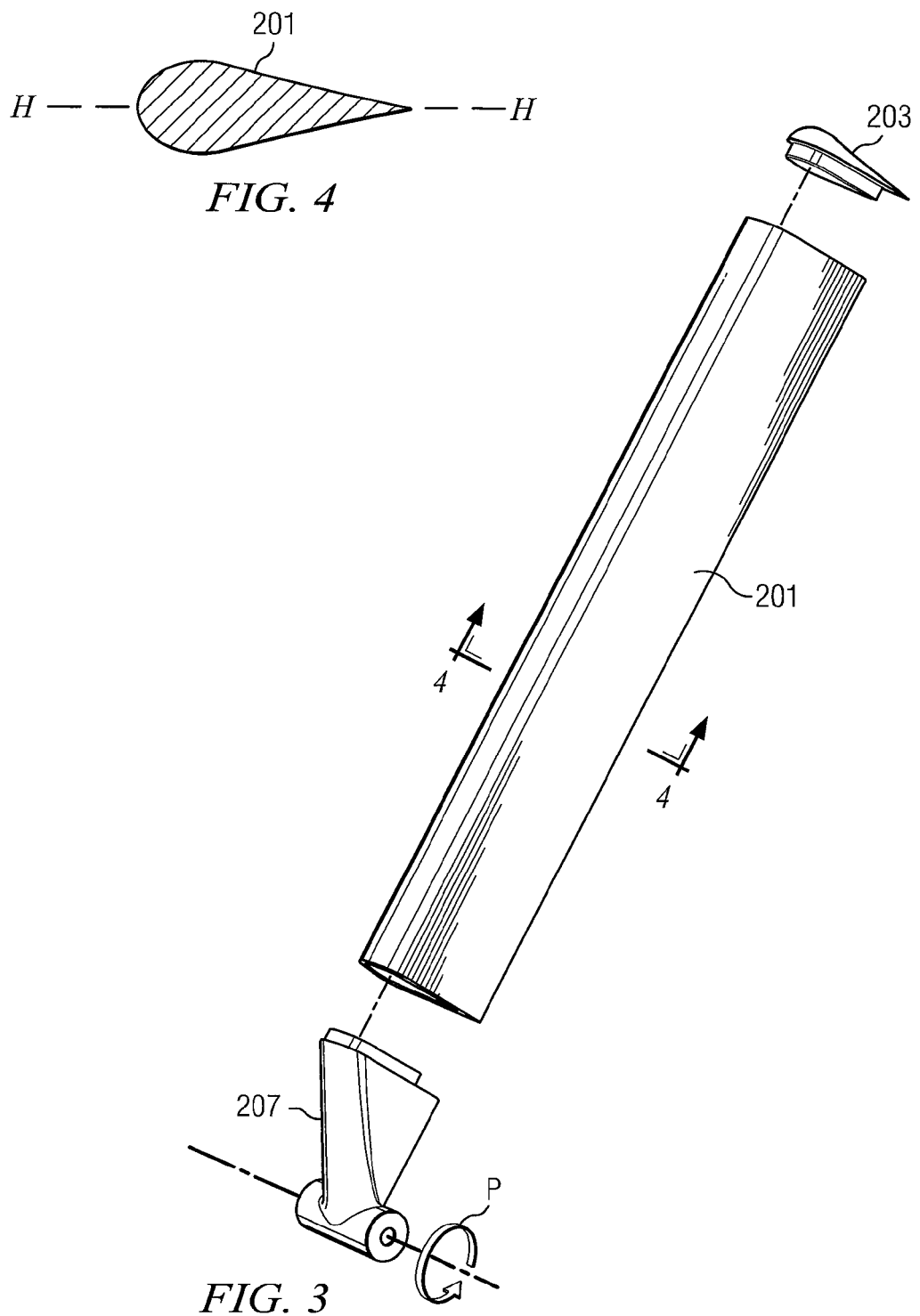
FIG. 3 illustrates an antenna assembly from FIG. 2 in isolation, comprising an antenna housing, a housing cap and an antenna base.
FIG. 4 is a section of FIG. 3's antenna housing, as further shown on FIG. 3.

Top-end pivoting antenna embodiments, such as illustrated on FIG. 1, are useful where basal-end pivoting embodiments, such as illustrated on FIGS. 2 through 4, are not possible or desirable. For example, basal-end pivoting embodiments may not be suitable at or near engineered water project infrastructure such as concrete fishways, dam spillways, penstock or other turbine entryways, sluice gates, or canals. Such environments tend to operate in higher water velocities, and may further present logistical challenges in physically accessing the riverbed or bottom in order to anchor and service a basal-end pivoting embodiment.

FIGS. 2 through 4 illustrate one example of a basal-end pivoting embodiment of the vertically-oriented antenna arrays disclosed herein. It will be understood on FIG. 2, that the array 200 is deployed in moving water (such as a stream or river) with a nominal direction of water flow WF. As on FIG. 1, each antenna on FIG. 2 also comprises an elongate antenna housing 201 having a hydrodynamic teardrop shape in cross-section, with first end 208 and second end 209. The advantageous hydrodynamics of the hydrodynamic teardrop shape are discussed above in the first paragraph of the "Summary" section of this disclosure. This inventive disclosure is not limited, however, to antenna housings with a teardrop shape in cross-section. In other embodiments (not illustrated), the antenna housing's cross-sectional shape may also be round, ovate, oblong, square or another shape befitting the installation conditions and antenna windings.

The external shell of antenna housing 201 is made of non-ferrous materials such as, without limitation, non-ferrous metals or alloys, wood, plastics, rubber, fiberglass, carbon fiber or resins. Antenna housing 201 may also be coated on the outside with materials or resins selected to increase durability or protect against abrasion. For wood shells, waterproofing is advantageous, using resins or the like.

Turning momentarily to FIGS. 3 and 4, FIG. 3 illustrates an antenna assembly from FIG. 2 in isolation, comprising an antenna housing 201, a housing cap 203 and an antenna base 207. Common features illustrated on FIGS. 2 through 4 share the same reference numeral. FIG. 4 is a cross-section of FIG. 3 as shown on FIG. 3, and illustrates the hydrodynamic teardrop-shaped profile of the antenna housing 201 as described in the preceding paragraph with reference to FIG. 2, and earlier in this disclosure in the first paragraph of the "Summary" section. For the avoidance of doubt, the hydrodynamic teardrop-shaped profile illustrated on FIG. 4 is symmetric about a centerline axis H-H as illustrated.

Returning to FIG. 2, each antenna housing 201 in FIG. 2 is connected to an antenna base 207. Pivot and swivel mechanisms 205 are in hinged connection with each antenna base 207. In current embodiments, each pivot and swivel mechanism 205 is anchored to the riverbed or ground bottom S by conventional anchoring technology 202, although future embodiments may include inventive anchoring technology. In preferred embodiments, each pivot and swivel assembly 205 is anchored to the bottom S in spaced relationship, per user selection, in a line that runs perpendicular to the direction of water flow, so that each antenna may remain substantially in the vertical plane of water flow. The inventive material disclosed herein, however, is not limited in this regard. In other embodiments (not illustrated), pivot and swivel assembly anchoring may be in other angles or shapes with respect to the direction of water flow, per user selection. Swivel structure on the pivot and swivel assembly 205 (as described further below) enables each antenna nonetheless to remain substantially in the vertical plane of water flow.

As discussed elsewhere in this disclosure, the hinged connection between the antenna base 207 and the upper portion of the pivot and swivel assembly 205 may, in some embodiments, be further restrained by torsion springs set to return the antenna to a vertical or angled (parallel to flow) rest position after deflection.

FIG. 2 also illustrates power and communications cables 204 being brought along the river bed or ground bottom S to address and serve each antenna. Connection and anchoring of the power and communication cables 204 may be by any conventional waterproof method so that electrical signals and communications in the cables are not compromised. As on FIG. 1, the power and communications cables 204 on FIG. 2 connect the antennas to a power supply, a transceiver and other hardware that may be located within the antenna housing 201, the housing cap 203, the antenna base 207 or elsewhere, such as on the shore or nearby underwater. Each antenna may receive a separate power and/or communications cable 204, or alternatively a single power and/or communications cable 204 may be attached to one end of the array 200 and pass through to neighboring antennas.

Current embodiments of the pivot and swivel assemblies 205 illustrated on FIG. 2 are of conventional design and manufacture, although future embodiments may include inventive technology. A lower portion of each pivot and swivel assembly 205 is anchored to the bottom S. The lower portion is in vertical swivel connection with an upper portion, so that when an antenna is attached to the upper portion, the antenna is free to swivel about a vertical axis. The upper portion is further disposed to receive an antenna base 207 via a generally horizontal hinged connection. When an antenna is in hinged connection (via its antenna base) to the upper portion of a corresponding pivot and swivel assembly, the antenna is free to pivot about the hinge 206, and so essentially becomes free to pivot about the bottom S (or other substantially horizontal plane at which the pivot and swivel assembly 205 may be anchored).

FIG. 3 illustrates the antenna base 207 in isolation, and shows the antenna base's portion of the hinged connection to the upper portion of a corresponding pivot and swivel assembly 205. FIG. 3 also illustrates the axis of pivot P about which the antenna is free to rotate. It will be understood from viewing FIGS. 2 and 3 together that a conventional pin or axle 206 may be used to form a hinged connection between the antenna base 207 and the upper portion of a corresponding pivot and swivel assembly 205 that permits multi-axial movement.

As noted above, the swivel structure in the pivot and swivel assemblies 205 leaves each antenna free to remain oriented substantially in the vertical plane of water flow. The pivot structure in the pivot and swivel assemblies 205 leaves the antenna free to rotate about the river bed S (or other substantially horizontal plane of anchoring). Each antenna may thus deflect responsive to temporary (or momentary) bursts of force or impact placed upon it by seasonally high water flows, or turbulence, or passing or accumulating debris. Such deflection will be understood to be primarily by rotating about the river bed S (or other substantially horizontal plane of anchoring) in the vertical plane of water flow. However, as illustrated on FIGS. 2 and 3, each pivot and swivel assembly 205 provides independent pivot structure and swivel structure to permit its corresponding antenna to deflect in multiple planes. It will be appreciated that although current embodiments of pivot and swivel assembly 205 are illustrated on FIGS. 2 and 3, future embodiments may also provide partial or full articulation at the antenna base 207 connection to the pivot and swivel assembly 205. Such articulation will enhance the ability of the antenna to deflect in multiple planes.

Housing caps 203 are also illustrated on FIGS. 2 and 3 at the top (water surface WS) end of each antenna. In some embodiments, these caps 203 may physically house each antenna's transceiver, thereby isolating them from electromagnetic interference generated by the antenna coil itself. The caps 203 further provide a construction seal for the top (water surface WS) end of the antenna housing 201. When sealed by the cap 203 and at the antenna base 207, the air core antenna assembly (which is buoyant) operates to cause the antenna to tend to return to a vertical or angled (parallel to flow, deflected downstream) rest position after momentary deflection by, for instance, passing or accumulating debris. Plastic and other buoyant materials used in the construction of the antennas, and torsion springs within the basal pivot and swivel mechanisms 205 will also be understood to assist the antennas to tend to return such vertical rest or angled position. A user-selected amount of buoyancy for any embodiment of the vertical antenna system may be controlled by a variety of mechanisms, including flooding portions of each antenna housing 201 with water.

Similar to disclosure above with reference to FIG. 1, it will be appreciated from FIG. 2 that an array of antennas 200 may be dimensionally configured by user selection of the lengths of the antennas and the spacing along the bottom at which each one is anchored. RFID charge and read zones CRZ are thus created between the antennas that extend nominally the entire length of antennas (as shown on FIG. 2). When the length of antennas is selected to be long enough, the entire depth of the water column potentially becomes available for RFID tag detection and interrogation. RFID charge and read zones CRZ will be only temporarily compromised while antennas deflect, and will be restored when the antennas return to their substantially vertical or angled (parallel to flow) rest position.

Although the inventive material in this disclosure has been described in detail along with some of its technical advantages, it will be understood that various changes, substitutions and alternations may be made to the detailed embodiments without departing from the broader spirit and scope of such inventive material as set forth in the following claims.

We claim:

1. An underwater basal-pivoting antenna assembly for subsurface RFID tag interrogation in flowing water, the water having flow in a known water flow direction, the water flowing over a bottom bed, the water further having a nominal water depth above the bottom bed, the antenna assembly comprising:
    an antenna, the antenna suitable for RFID tag interrogation;
    an elongate antenna housing, the antenna housing including a housing length separating first and second ends thereof, the antenna resident in the housing, the housing length having a symmetric hydrodynamic teardrop cross-sectional shape, the housing length further selected to enable the antenna to monitor for signals across substantially all of the water depth; and
    a pivot/swivel mechanism linked to the antenna housing at the first end thereof, the pivot/swivel mechanism further suitable to be anchored ultimately to the bottom bed, such that when the pivot/swivel mechanism is anchored to the bottom bed, the pivot/swivel mechanism permits the second end of the antenna housing to rotate freely, responsive to water flow, about the first end in a substantially vertical plane parallel to the water flow direction.

2. The antenna assembly of claim 1, in which the pivot/swivel mechanism further permits the second end of the antenna housing to rotate generally about the first end in a range of planes, wherein planes in the range thereof have corresponding vectors with components in both a vertical plane parallel to the water flow direction and a horizontal plane parallel to the water flow direction.

3. The antenna assembly of claim 1, further comprising at least one torsion spring in the pivot/swivel mechanism, wherein spring resistance therefrom encourages the antenna housing to return to a predetermined rest position in a vertical plane parallel to the water flow.

4. The antenna assembly of claim 1, further comprising a housing cap at the second end of the antenna housing, the housing cap and the antenna housing connected by a waterproof seal.

5. The antenna assembly of claim 4, further comprising a transceiver in electrical signal communication with the antenna, and in which the transceiver is located in a location selected from the group consisting of:
    (a) the antenna housing;
    (b) the pivoting mechanism;
    (c) the bottom bed;
    (d) the housing cap; and
    (e) a location away from the water flow.

6. The antenna assembly of claim 1, in which the antenna housing is made from a material selected from the group consisting of:
    (a) non-ferrous metals or alloys thereof;
    (b) wood;
    (c) plastic;
    (d) rubber;
    (e) carbon fiber;
    (f) fiber glass; and
    (g) resin.

7. The antenna assembly of claim 1, in which the antenna housing has an abrasion-resistant external coating.

8. An underwater basal-pivoting antenna array for subsurface RFID tag interrogation in flowing water, the water having flow in a known water flow direction, the water flowing over a bottom bed, the water further having a nominal water depth above the bottom bed, the antenna array comprising:

a plurality of antenna assemblies spaced linearly apart on a predetermined linear spacing interval pattern, each antenna assembly further comprising:
  an antenna, the antenna suitable for RFID interrogation;
  an elongate antenna housing, the antenna housing including a housing length separating first and second ends thereof, the antenna resident in the housing, the housing length having a symmetric hydrodynamic teardrop cross-sectional shape, the housing length further selected to enable the antenna to monitor for signals across substantially all of the water depth; and
  a pivot/swivel mechanism linked to the antenna housing at the first end thereof, the pivot/swivel mechanism further suitable to be anchored ultimately to the bottom bed, such that when the pivot/swivel mechanism is anchored to the bottom bed, the pivot/swivel mechanism permits the second end of the antenna housing to rotate freely, responsive to water flow, about the first end in a substantially vertical plane parallel to the water flow direction;
  wherein each antenna housing's second end is free to rotate independently from corresponding second ends of other antenna housings.

9. The antenna array of claim 8, in which antennas are selectively energized according to a predetermined sampling scheme, the sampling scheme configured to energize antennas more frequently in zones in which tagged species are more likely to travel.

10. The antenna array of claim 8, in which:
  (1) each antenna is addressed by an antenna cable, each antenna cable configured to carry power to the antenna from a power source and carry data signals between the antenna and a transceiver; and
  (2) the antenna cables are connected in a topology selected from the group consisting of (a) a star configuration in which each antenna cable connects its corresponding antenna directly to a power source and a transceiver, and (b) a daisy chain configuration in which a plurality of antenna cables connect their corresponding antennas into a loop thereof, the loop also including a power source and a transceiver connected therein.

11. The antenna array of claim 8, in which the each antenna assembly's pivot/swivel mechanism further permits the second end of the corresponding antenna housing to rotate generally about the first end in a range of planes, wherein planes in the range thereof have corresponding vectors with components in both a vertical plane parallel to the water flow direction and a horizontal plane parallel to the water flow direction.

12. The antenna array of claim 8, further comprising at least one torsion spring in the pivot/swivel mechanism of selected antenna assemblies, wherein spring resistance from at least one torsion spring encourages the corresponding antenna housing to return to a predetermined rest position in a vertical plane parallel to the water flow.

13. The antenna array of claim 8, each antenna assembly further comprising a housing cap at the second end thereof, each antenna assembly's housing cap connected to its corresponding antenna housing by a waterproof seal.

14. The antenna array of claim 13, further comprising at least one transceiver in electrical signal communication with the antennas, and in which each transceiver is located in a location selected from the group consisting of:
  (a) the antenna housing;
  (b) the pivoting mechanism;
  (c) the bottom bed;
  (d) the housing cap; and
  (e) a location away from the water flow.

15. The antenna array of claim 14, in which at least one transceiver is further operable to be in electrical communication with more than one antenna.

16. The antenna array of claim 8, in which each antenna housing is made from a material selected from the group consisting of:
  (a) non-ferrous metals or alloys thereof;
  (b) wood;
  (c) plastic;
  (d) rubber;
  (e) carbon fiber;
  (f) fiber glass; and
  (g) resin.

17. The antenna array of claim 8, in which at least one antenna housing has an abrasion-resistant external coating.

18. An underwater basal-pivoting antenna assembly for subsurface RFID tag interrogation in flowing water, the water having flow in a known water flow direction, the water flowing over a bottom bed, the water further having a nominal water depth above the bottom bed, the antenna assembly comprising:
  an antenna, the antenna suitable for RFID tag interrogation;
  an elongate antenna housing, the antenna housing having an abrasion-resistant external coating, the antenna housing including a housing length separating first and second ends thereof, the antenna resident in the housing, the housing length having a symmetric hydrodynamic teardrop cross-sectional shape, the housing length further selected to enable the antenna to monitor for signals across substantially all of the water depth;
  a pivot/swivel mechanism linked to the antenna housing at the first end thereof, the pivot/swivel mechanism further suitable to be anchored ultimately to the bottom bed, such that when the pivot/swivel mechanism is anchored to the bottom bed, the pivot/swivel mechanism permits the second end of the antenna housing to rotate freely, responsive to water flow, about the first end in a range of planes either side of a vertical plane substantially parallel to the water flow direction, wherein planes in the range thereof have corresponding vectors with components in both a vertical plane parallel to the water flow direction and a horizontal plane parallel to the water flow direction;
  at least one torsion spring in the pivot/swivel mechanism, wherein spring resistance therefrom encourages the antenna housing to return to a predetermined rest position in a vertical plane parallel to the water flow; and
  a housing cap at the second end of the antenna housing, the housing cap and the antenna housing connected by a waterproof seal.

* * * * *